(12) United States Patent
Inagaki (10) Patent No.: US 8,537,449 B2
(45) Date of Patent: Sep. 17, 2013

(54) OPTICAL SCANNING DEVICE

(75) Inventor: Yoshihiro Inagaki, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 391 days.

(21) Appl. No.: 13/040,420

(22) Filed: Mar. 4, 2011

(65) Prior Publication Data

US 2011/0222135 A1    Sep. 15, 2011

(30) Foreign Application Priority Data

Mar. 9, 2010   (JP) ................................. 2010-051343

(51) Int. Cl.
G02B 26/08      (2006.01)

(52) U.S. Cl.
USPC ...................... 359/204.1; 359/204.2; 347/243

(58) Field of Classification Search
USPC .................. 359/204.1–204.4; 347/233, 238, 347/243–244
See application file for complete search history.

(56) References Cited

U.S. PATENT DOCUMENTS

| | | | |
|---|---|---|---|
| 6,034,806 | A | 3/2000 | Inagaki et al. |
| 6,833,939 | B1 | 12/2004 | Ichikawa |
| 7,164,515 | B2 | 1/2007 | Ito et al. |
| 2007/0146738 | A1 | 6/2007 | Nakajima |

FOREIGN PATENT DOCUMENTS

| | | |
|---|---|---|
| JP | 10-253904 A | 9/1998 |
| JP | 2001-215423 A | 8/2001 |
| JP | 2003-182139 A | 7/2003 |
| JP | 2004-77714 A | 3/2004 |
| JP | 2005-216925 A | 8/2005 |
| JP | 2006-088567 A | 4/2006 |
| JP | 2007-168299 A | 7/2007 |
| JP | 2008-311499 A | 12/2008 |

OTHER PUBLICATIONS

Copending application of Yoshihiro Inagaki; U.S. Appl. No. 12/862,269, filed on Aug. 24, 2010
Office Action (Notification of Reasons for Refusal) dated Jan. 24, 2012, issued in the corresponding Japanese Patent Application No. 2010-051343, and an English Translation thereof. (10 pages).

*Primary Examiner* — James Phan
(74) *Attorney, Agent, or Firm* — Buchanan Ingersoll & Rooney PC (57) ABSTRACT

An optical scanning device has a light source comprising a plurality of light emitting points arranged on a plane two-dimensionally; a deflector for deflecting beams emitted from the light emitting points in a main-scanning direction; a first optical system for directing the beams emitted from the light emitting points to the deflector; and a second optical system for directing the beams deflected by the deflector to a photosensitive member and for imaging the beams on a surface of the photosensitive member. The plurality of light emitting points are arranged in a parallelogram lattice composed of M by N lattice points, wherein M and N are integers equal to or greater than six, with none of the light emitting points allocated on central (M−4) by (N−4) lattice points.

6 Claims, 11 Drawing Sheets

OPTICAL SCANNING DEVICE

This application is based on Japanese Patent Application No. 2010-051343 filed on Mar. 9, 2010, the content of which is incorporated herein by reference.

BACKGROUND OF THE INVENTION

1. Field of the Invention

The present invention relates to an optical scanning device, and more particularly to an optical scanning device that is suited to be employed in an electrophotographic image forming apparatus such as an electrophotographic printer or copying machine.

2. Description of Related Art

In recent years, for this kind of optical scanning devices, using a VCSEL (vertical cavity surface emitting laser) having a multiple of light emitting points in a light source has been suggested so as to comply with demands for high-density image formation and for high-speed image formation.

Japanese Patent Laid-Open Publication No. 2003-182139 suggests that streaky density unevenness due to reciprocity failure be reduced by setting the light quantity around the boundary of a scanning area to a low value. Japanese Patent Laid-Open Publication No. 2004-77714 suggests that density unevenness around the boundary be made inconspicuous by performing interlace scanning wherein a plurality of beams are scanned on scanning lines at regular intervals. Japanese Patent Laid-Open Publication No. 2007-168299 suggests that light emitting points be arranged in a thinned way such that overlap portions subjected to a multiple of scanning motions will not be thicker.

In the art of setting the light quantity around the boundary to a low value, however, there causes the following problem. When an image including both a pattern to be formed by a multiple of scanning motions and a pattern to be formed by one scanning motion is formed, the density of the latter pattern will be low because the boundary, where the light quantity is low, is not an overlap portion. In the art of performing interlace scanning, also, there causes the following problem. In interlace scanning, a larger area is scanned at the same time, and the scanning is susceptible to errors made temporarily, such as driving unevenness of the photosensitive drum.

In the art of thinning light emitting points, there causes the following problem. Although the number of light emitting points is small, light emitting points in the peripheral part are located far from the optical axis, and the light emitting points in the peripheral part and the light emitting points in the central part have a great difference in the optical performance. More specifically, in view of thermal crosstalk and the wiring from the light emitting points in the peripheral part to the light emitting points in the central part, there is a limit in close alignment of the light emitting points. Accordingly, it is necessary to arrange some light emitting points far away from the optical axis, and consequently, the formed image is influenced by the optical aberration.

SUMMARY OF THE INVENTION

An object of the present invention is to provide an optical scanning device that permits quality images with a high density to be formed at a high speed while reducing density unevenness and eliminating the effects of thermal crosstalk.

An optical scanning device according to an embodiment of the present invention comprises: a light source comprising a plurality of light emitting points arranged on a plane two-dimensionally; a deflector for deflecting beams emitted from the light emitting points in a main-scanning direction; a first optical system for directing the beams emitted from the light emitting points to the deflector; and a second optical system for directing the beams deflected by the deflector to a photosensitive member and for imaging the beams on a surface of the photosensitive member; wherein the plurality of light emitting points are arranged in a parallelogram lattice composed of M by N lattice points, wherein M and N are integers equal to or greater than six, with none of the light emitting points allocated on central (M−4) by (N−4) lattice points.

BRIEF DESCRIPTION OF THE DRAWINGS

This and other objects and features of the present invention will be apparent from the following description with reference to the accompanying drawings.

DETAILED DESCRIPTION OF THE PREFERRED EMBODIMENTS

Optical scanning devices according to the preferred embodiments are hereinafter described with reference to the accompanying drawings.

General Structure of the Optical Scanning Device;
See FIG. 1

Figure 1:
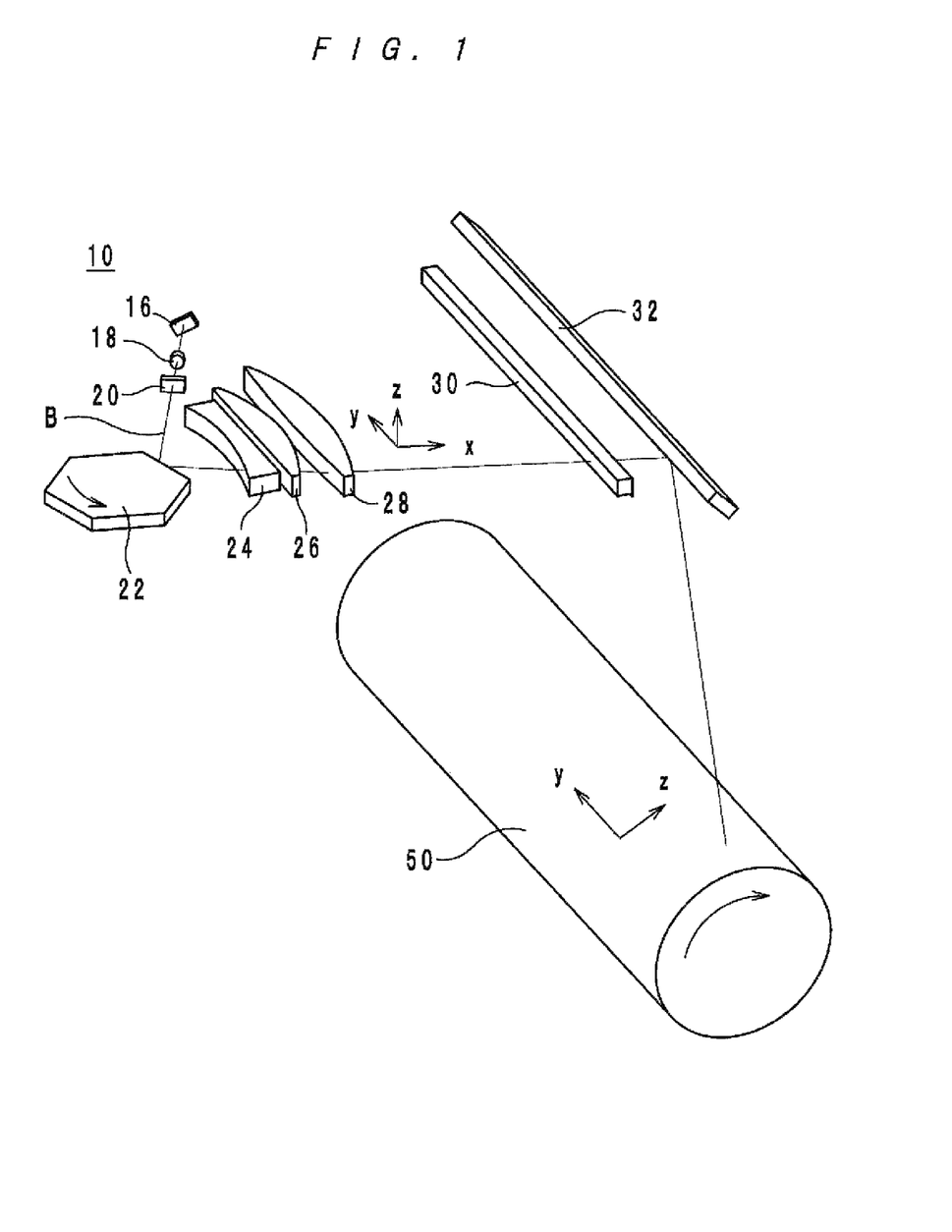
FIG. 1 is a perspective view of an optical scanning device according to an embodiment of the present invention.

As shown by FIG. 1, an optical scanning device 1 comprises a light source (surface emitting diode) 16, a collimator lens 18, a cylindrical lens 20, a polygon mirror 22, scanning lenses 24, 26, 28 and 30, and a mirror 32. The light source 16 emits a plurality of beams B concurrently. In FIG. 1, however, only one beam B is shown so as to avoid a complicate illustration.

An optical system for directing the beams B emitted from the light source 16 to the polygon mirror 22 is referred to a first optical system. In the first optical system, the collimator lens 18 shapes each of the beams B, which is a beam of divergent light rays emitted from the light source 16, into a beam of substantially parallel light rays. Further, the cylindrical lens 20 shapes each of the beams B into a linear form extending in a sub-scanning direction "z" on reflection surfaces of the polygon mirror 22.

The polygon mirror 22 deflects the beams B in a main-scanning direction "y". An optical system for imaging the deflected beams B on the surface of the photosensitive drum 50 is referred to as a second optical system. In the second optical system, the scanning lenses 24, 26, 28 and 30 correct various kinds of aberration and image the beams B on the surface of the photosensitive drum 50. The mirror 32 reflects the beams B that passed through the scanning lens 30 to the photosensitive drum 50. In FIG. 1, the arrow "x" shows the traveling direction of the beams B.

The photosensitive drum 50 is cylindrical and is driven to rotate in one direction at a constant speed. By repetitious scanning of the beams B on the circumferential surface of the photosensitive drum 50 in the main-scanning direction "y" and by the constant-speed rotation of the photosensitive drum 50, a two-dimensional electrostatic latent image is formed on the circumferential surface of the photosensitive drum 50. The process of forming an electrostatic latent image on the surface of the photosensitive drum 50 and a process of developing the electrostatic latent image, a process of transferring the image onto a recording sheet and a process of fixing the image onto the recording sheet are well known, and detailed descriptions of these processes are omitted.

Structure of the Light Source

Figure 2:
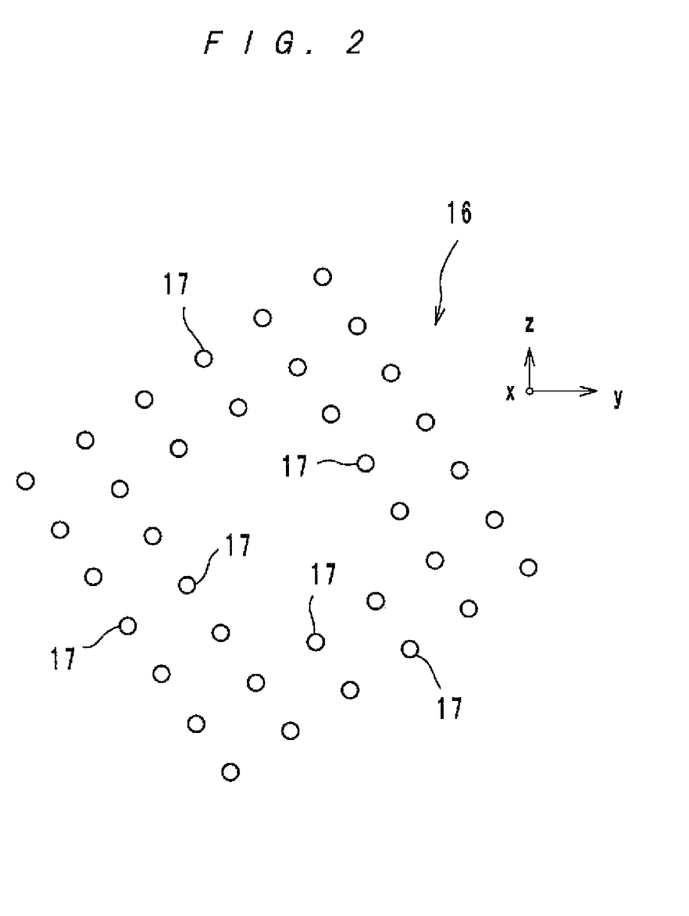
FIG. 2 is an illustration showing an arrangement of light emitting points of a light source.

As shown in FIG. 2, a surface emitting diode comprising a multiple of light emitting points 17 is used as the light source 16. The light emitting points 17 are arranged in a parallelogram lattice composed of (M×N) lattice points, wherein M and N are integers equal to or greater than six, and no light emitting points are located in the central part composed of {(M−4)×(N−4)} lattice points. In the case of FIG. 2, 36 light emitting points 17 are arranged in a lattice composed of 42 (six-by-seven) lattice points with no light emitting points allocated on six lattice points in the center.

More specifically, the light emitting points 17 are arranged in a rectangular lattice, and the rectangular lattice is tilted to the main-scanning direction "y". If some of the light emitting points 17 are located in the central part, the wiring to the light emitting points located in the central part shall be woven through the peripheral light emitting points 17, and it is necessary to space the light emitting points 17 from each other. However, by locating no light emitting points in the central part as shown by FIG. 2, enlargement of the light source 16 due to the wiring can be prevented, and accumulation of heat in the central part due to thermal crosstalk can be prevented. Thus, downsizing of the light source 16 becomes possible.

Also, if the light emitting points 17 are arranged at mutually different distances from the optical axis of the beams B, the beams B will have great differences in the optical performance. In the case of FIG. 2, however, since there are no light emitting points in the central part, the differences among the beams B in the distance from the optical axis are small, and the differences among the beams B in the optical performance can be minimized.

First Embodiment; See FIG. 3

Figure 3:
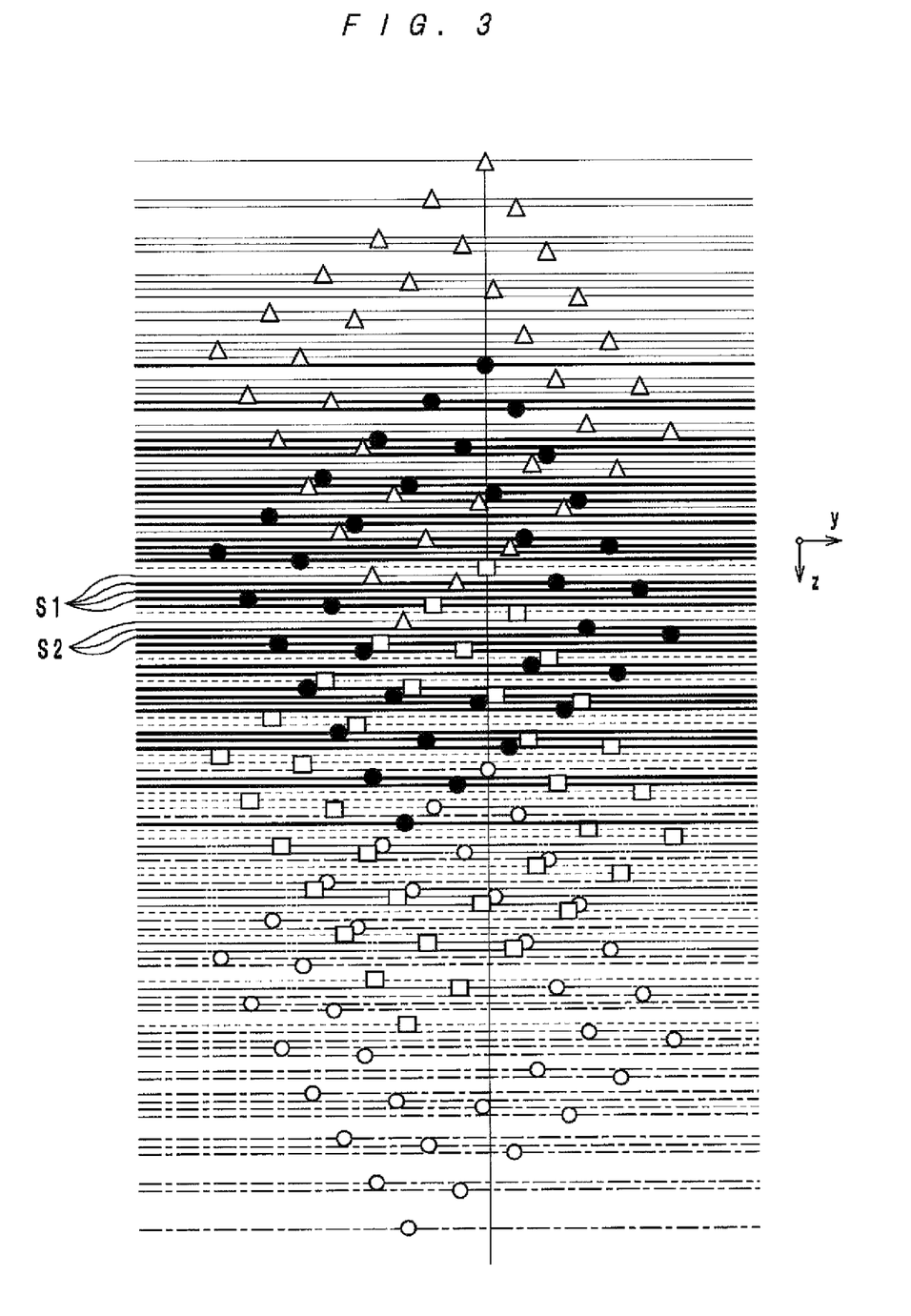
FIG. 3 is a view showing a frame format of scanning according to a first embodiment.

A first embodiment of scanning the photosensitive drum 50 (a first scanning example) by use of the light source 16 structured as described above is hereinafter described with reference to FIG. 3. In FIG. 3 (also in FIGS. 4 to 11), the triangles, the filled circles, the squares and the open circles show the image points of beams on the photosensitive drum at certain times. Image points shown by the same mark are exposed at the same time, and image points shown by different marks are made by beams reflected by different surfaces of the polygon mirror and are not exposed at the same time. The vertical line substantially in the center of the drawing is an imaginary line drawn among the most upstream ones, with respect to the sub-scanning line Z, of the image points shown by the respective same marks. The horizontal lines show scanning lines on which the image points move with rotation of the polygon mirror. The image points marked with triangles move on scanning lines shown by thin lines. The image points marked with filled circles move on scanning lines shown by heavy lines. The image points marked with squares move on scanning lines shown by dotted lines. The image points marked with open circles move on scanning lines shown by dashed lines.

The image points exposed at the same time are arranged in the same way as the light emitting points 17 shown by FIG. 2. Actually, there are cases wherein the scale factors of the optical system in the main-scanning direction y and in the sub-scanning direction z are different from each other. In such a case, the image points are magnified or reduced vertically or horizontally. However, the positional relationship among the image points does not change.

In the first embodiment shown by FIG. 3, focusing on the scanning lines concurrently scanned, the most upstream one line (first line) is apart from the other lines, and between the first line and the second most upstream line (second line), there are scanning lines S1 scanned by beams reflected by other surfaces of the polygon mirror. The second line and the third line are adjacent to each other. Between the third line and the fourth line, there are scanning lines S2 scanned by beams reflected by other surfaces of the polygon mirror. In this way, the number of concurrently scanned adjacent lines varies 1, 2, 3, 4, 2, 4, 4, 4, 2, 4, 3, 2 and 1 in the sub-scanning direction z. Thus, the number is small in the upstream part and in the downstream part with respect to the sub-scanning direction z, and the number is large in the central part. By gradually varying the number of concurrently scanned adjacent lines in the sub-scanning direction z, density unevenness around the boundaries can be reduced.

In the area shown by FIG. 3, scanning lines are gappy in the upper part and in the lower part. In the central part, however, the gaps among the concurrently scanned lines are filled with scanning lines exposed to beams reflected by other surfaces of the polygon mirror, and consequently, the scanning lines are arranged at uniform intervals. In one scanning motion, all the beams scan on different lines. During several scanning motions, however, there are some overlap areas, that is, some scanning lines are scanned by two beams reflected by different surfaces of the polygon mirror. For the overlap areas, the exposure values by beams emitted from the corresponding light emitting points are reduced so that there will be no light-quantity differences between the overlap areas and non-overlap areas. In order to reduce the exposure values, the illuminance of the light emitting points may be reduced, or the irradiation time of the light emitting points may be shortened.

Second Embodiment; See FIG. 4

Figure 4:
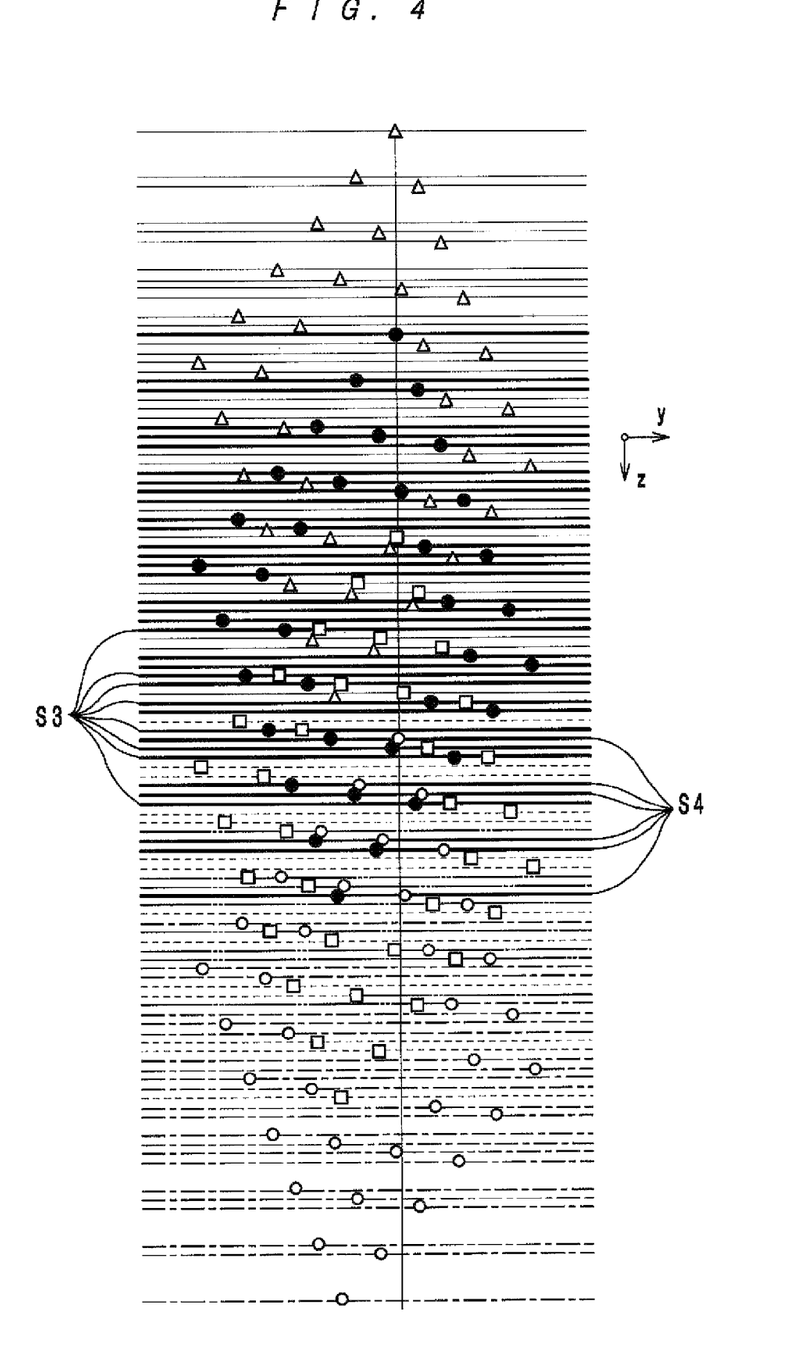
FIG. 4 is a view showing a frame format of scanning according to a second embodiment.

In a second embodiment shown by FIG. 4, the number of light emitting points is equal to that in the first embodiment. However, the light emitting points are arranged in a diamond that is formed by connecting the bases of two equilateral triangles to each other. Considering the action of heat from a light emitting point to the adjacent light emitting points, the equilateral-triangular arrangement of the light emitting points is good in heat radiation efficiency. In the second embodiment, overlap areas appear differently from those in the first embodiment. Specifically, eight scanning lines S3 are scanned by beams reflected by a surface and the next surface of the polygon mirror, and six scanning lines S4 are scanned by beams reflected by beams reflected by a surface and the surface after the next of the polygon mirror.

Third Embodiment; See FIG. 5

Figure 5:
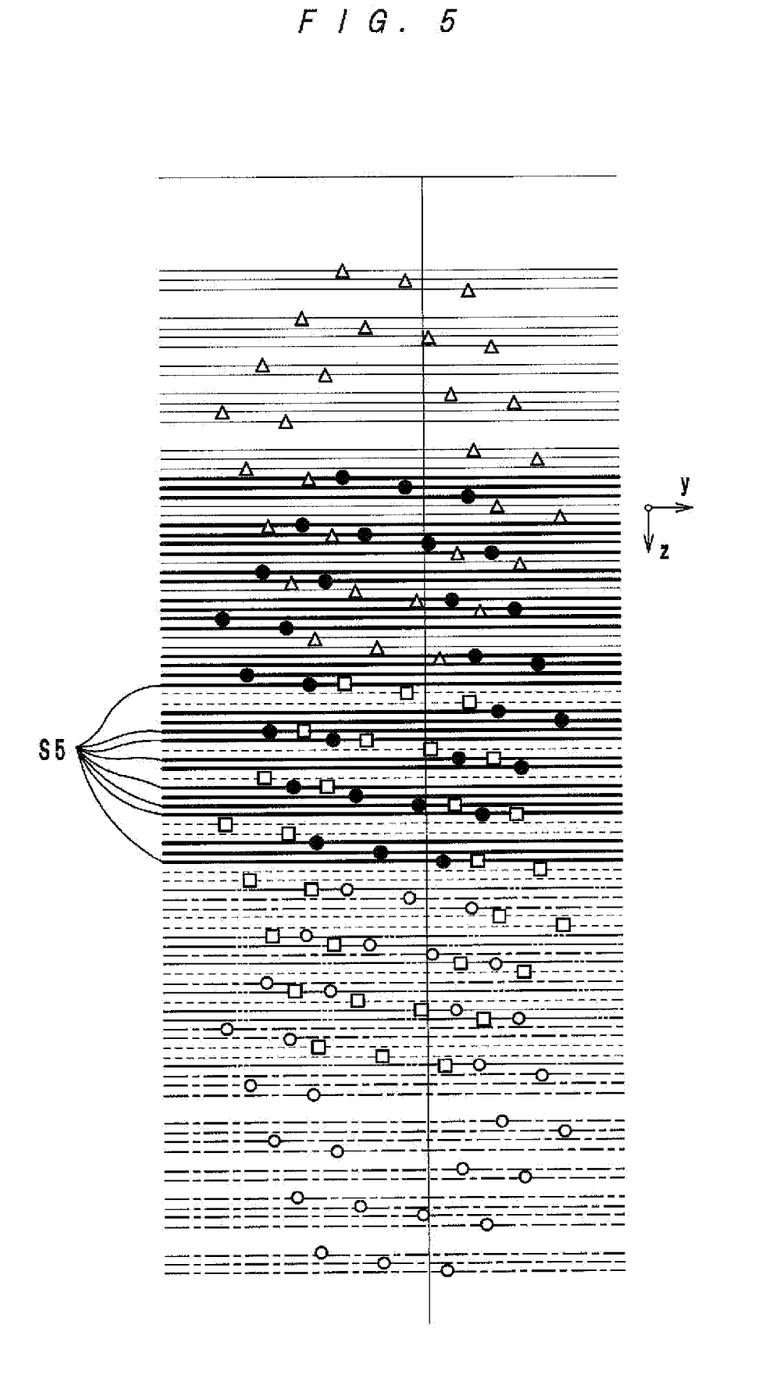
FIG. 5 is a view showing a frame format of scanning according to a third embodiment.

A third embodiment shown by FIG. 5 is like a modification of the second embodiment. In the third embodiment, three light emitting points that are arranged in the upper part of the second embodiment and three light emitting points that are arranged in the lower part of the second embodiment are eliminated. The third embodiment is the same as the second embodiment in that eight scanning lines S5 are scanned by beams reflected by a surface and the next surface of the polygon mirror. However, in the third embodiment, it does not occur that six scanning lines are scanned by beams reflected by a surface and the surface after the next of the polygon mirror. In the third embodiment, since three light emitting points in the upper part and three light emitting points in the lower part, which are apart from the optical axis, are eliminated, it is easy to adjust the optical performances of the beams emitted from the respective light emitting points to one another, compared with the second embodiment.

Fourth Embodiment; See FIG. 6

Figure 6:
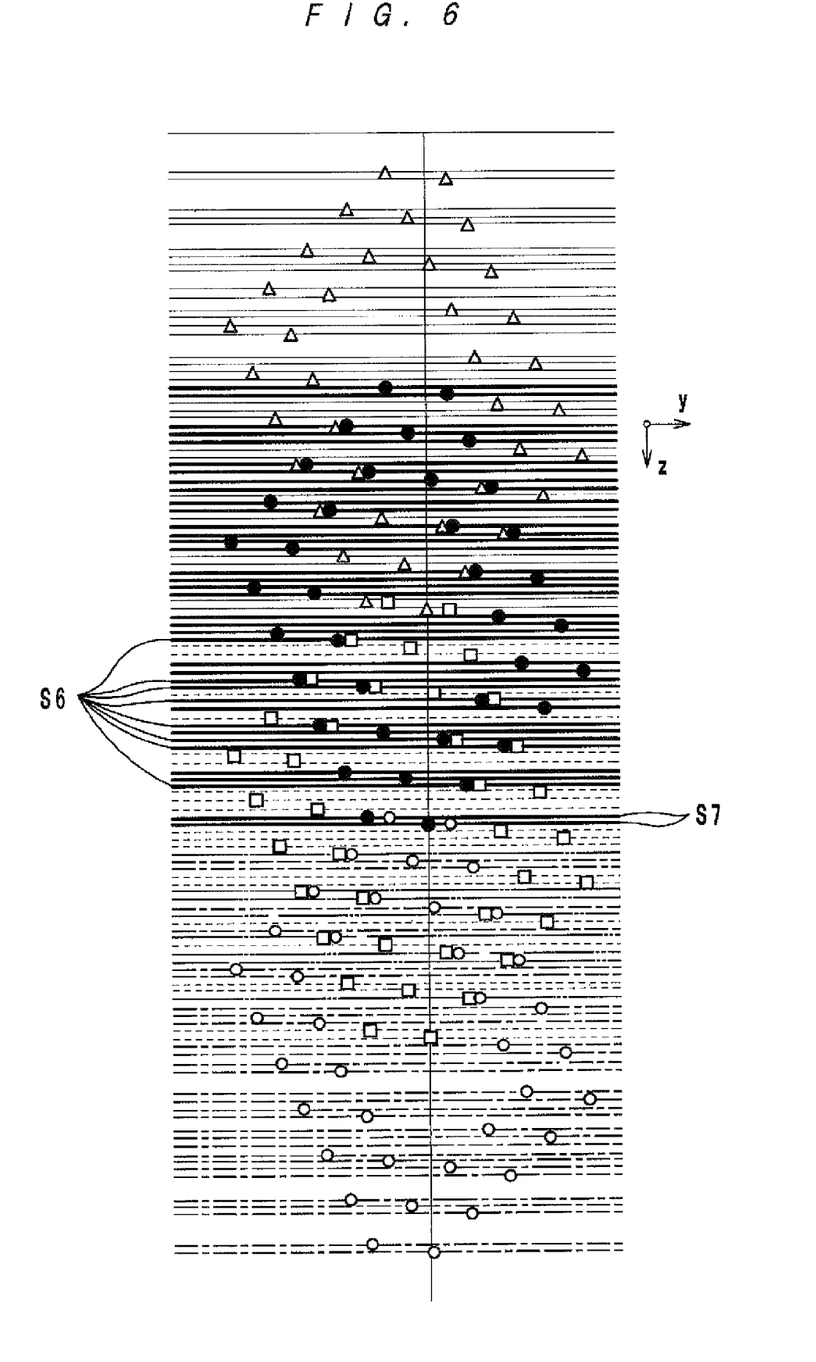
FIG. 6 is a view showing a frame format of scanning according to a fourth embodiment.

In a fourth embodiment shown by FIG. 6, light emitting points are arranged in a lattice composed of 48 (six-by-eight) lattice points, and more specifically, the light emitting points are located on 38 lattice points excluding eight points in the central part, the uppermost point and the lowermost point of the lattice. In the fourth embodiment, therefore, eight scanning lines S6 are scanned by beams reflected by a surface and the next surface of the polygon mirror, and two scanning lines S7 are scanned by beams reflected by a surface and the surface after the next of the polygon mirror.

Fifth Embodiment; See FIG. 7

Figure 7:
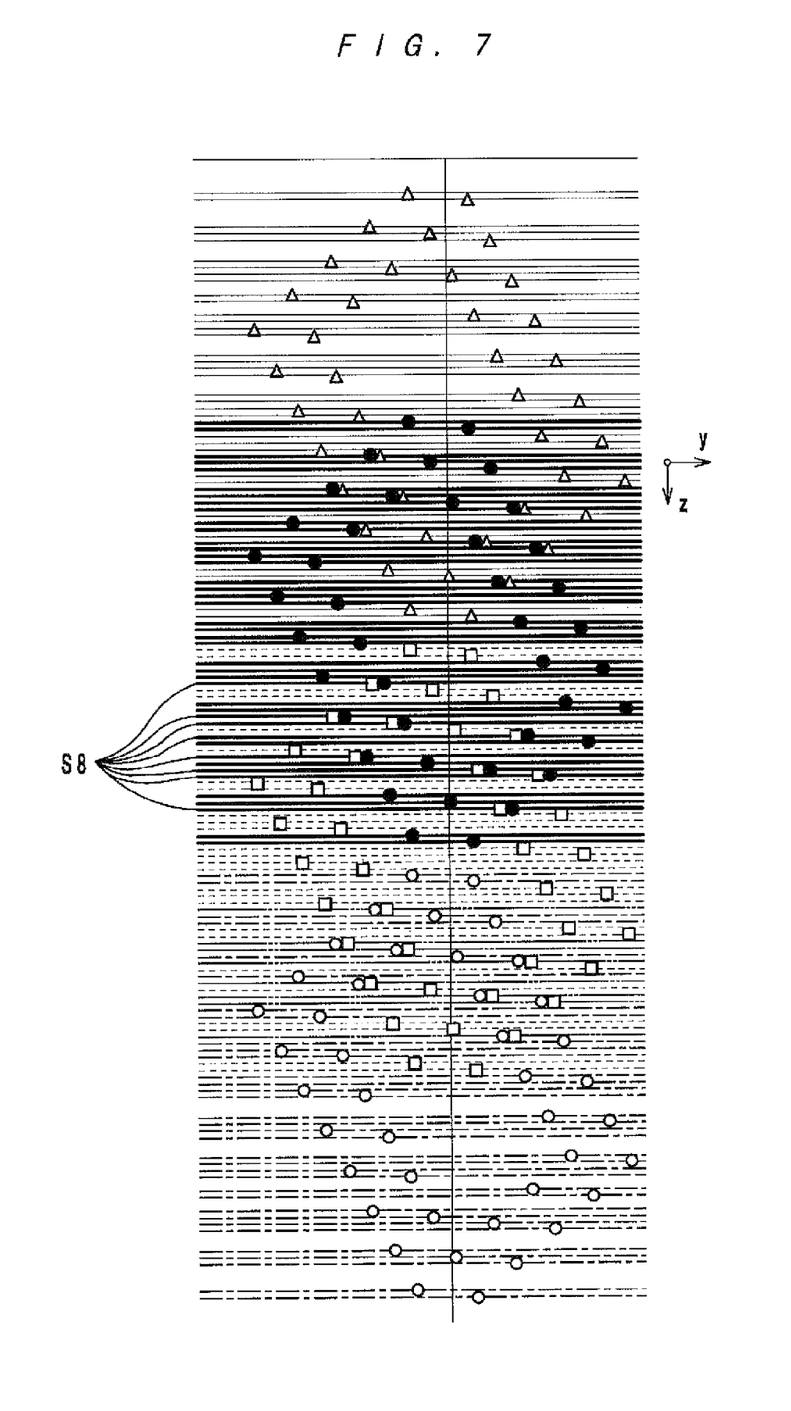
FIG. 7 is a view showing a frame format of scanning according to a fifth embodiment.

In a fifth embodiment shown by FIG. 7, light emitting points are arranged in a lattice composed of 54 (six-by-nine) lattice points, and more specifically, the light emitting points are located on 42 lattice points excluding ten points in the central part, the uppermost point and the lowermost point of the lattice. In the fifth embodiment, eight scanning lines S8 are scanned by beams reflected by a surface and the next surface of the polygon mirror.

Sixth Embodiment; See FIG. 8

Figure 8:
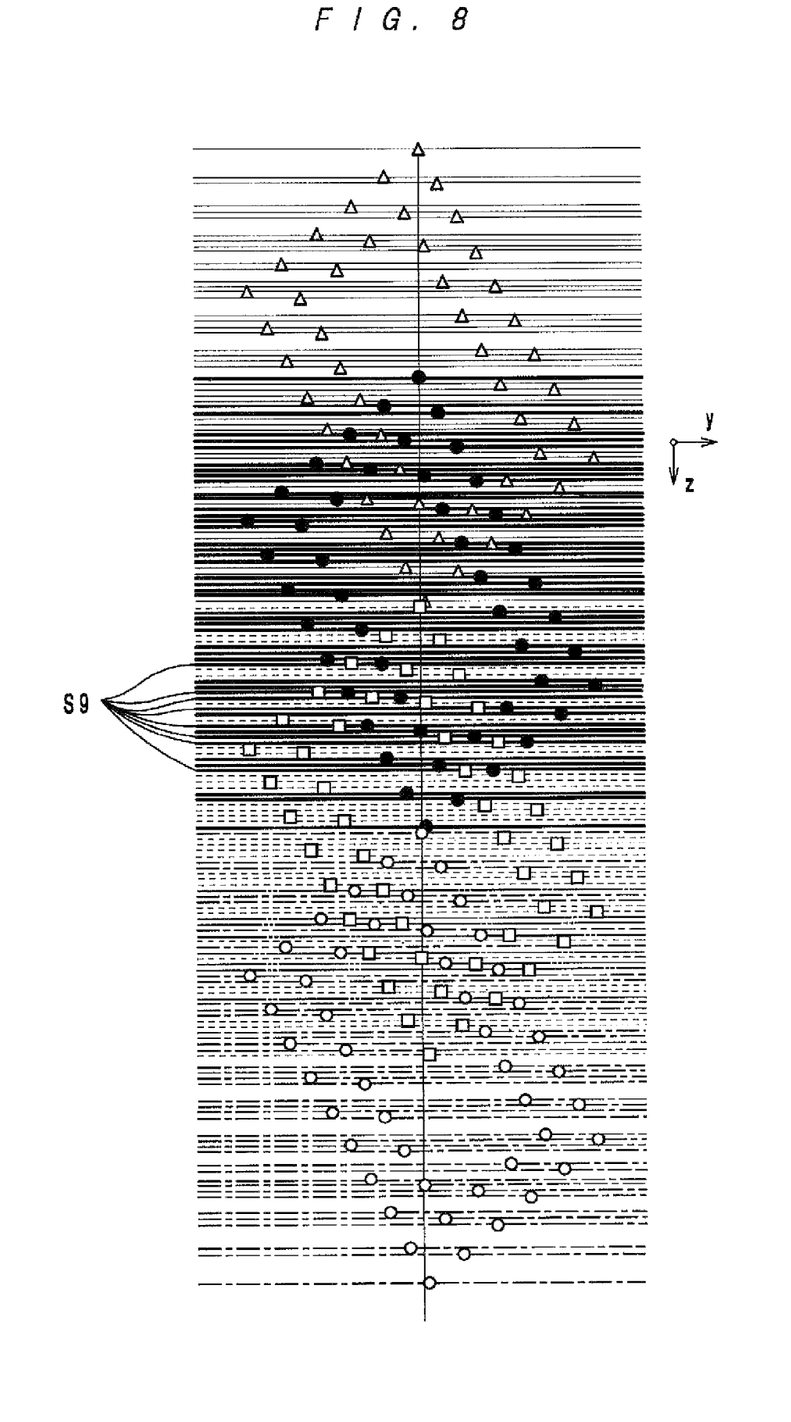
FIG. 8 is a view showing a frame format of scanning according to a sixth embodiment.

In a sixth embodiment shown by FIG. 8, light emitting points are arranged in a lattice composed of 60 (six-by-ten) lattice points, and more specifically, the light emitting points are located on 48 lattice points excluding 12 points in the central part. In the sixth embodiment, eight scanning lines S9 are scanned by beams reflected by a surface and the next surface of the polygon mirror.

Seventh Embodiment; See FIG. 9

Figure 9:
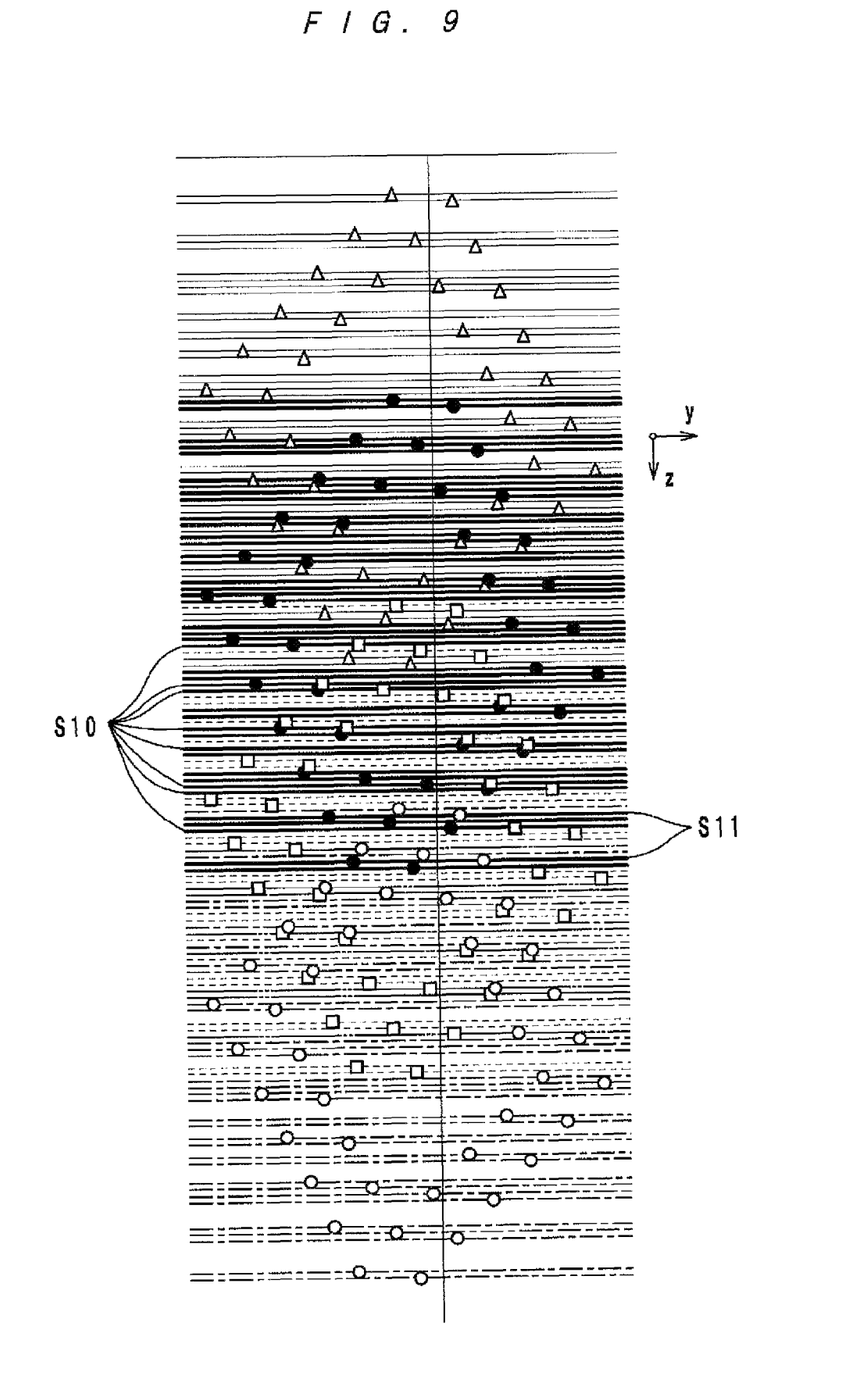
FIG. 9 is a view showing a frame format of scanning according to a seventh embodiment.

In a seventh embodiment shown by FIG. 6, light emitting points are arranged in a lattice composed of 56 (seven-by-eight) lattice points, and more specifically, the light emitting points are located on 42 lattice points excluding 12 points in the central part, the uppermost point and the lowermost point of the lattice. In the seventh embodiment, eight scanning lines S10 are scanned by beams reflected by a surface and the next surface of the polygon mirror, and two scanning lines S11 are exposed to beams reflected by a surface and the surface after the next of the polygon mirror.

Eighth Embodiment; See FIG. 10

Figure 10:
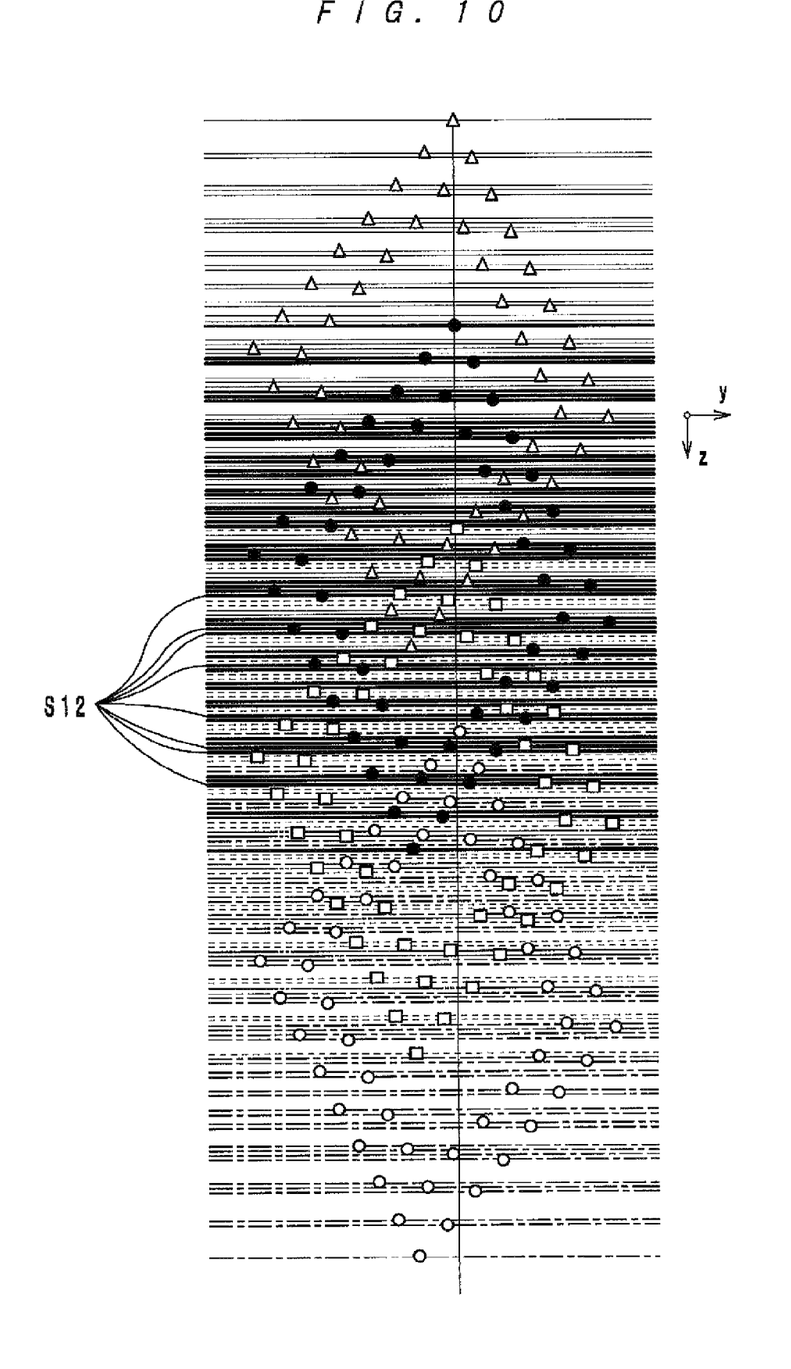
FIG. 10 is a view showing a frame format of scanning according to an eighth embodiment.

In an eighth embodiment shown by FIG. 10, light emitting points are arranged in a lattice composed of 72 (eight-by-nine) lattice points, and more specifically, the light emitting points are located on 52 lattice points excluding 20 points in the central part. In the eighth embodiment, eight scanning lines S12 are scanned by beams reflected by a surface and the next surface of the polygon mirror.

Ninth Embodiment; See FIG. 11

Figure 11:
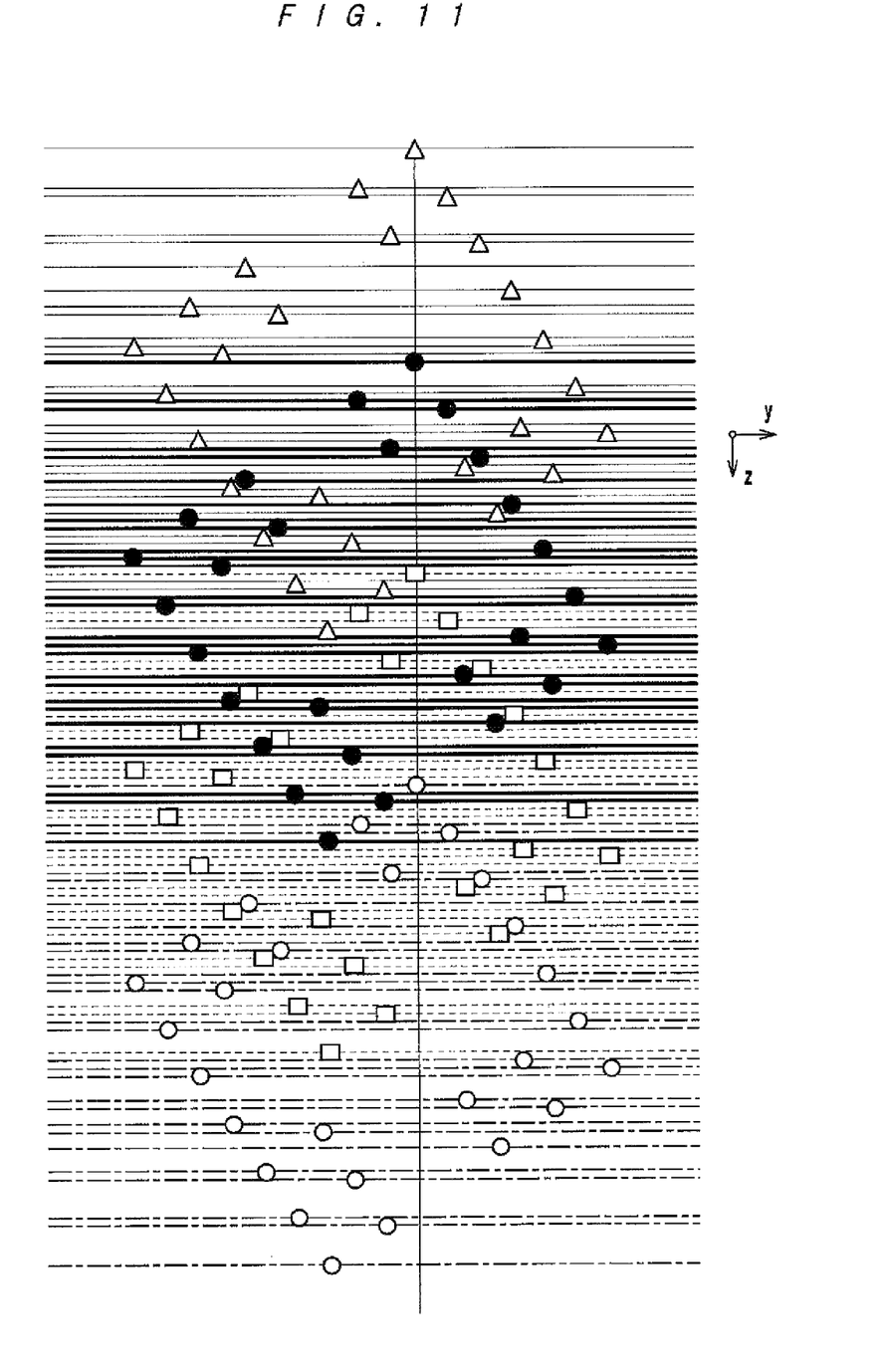
FIG. 11 is a view showing a frame format of scanning according to a ninth embodiment.

A ninth embodiment shown by FIG. 11 is like a modification of the first embodiment. In the ninth embodiment, some of the light emitting points are eliminated from the structure of the first embodiment so that no scanning lines are scanned by beams reflected from different surfaces of the polygon mirror. Compared with the first embodiment, in the ninth embodiment, adjustment and control are easy, but image formation is affected by misalignment of image points.

Light Emitting Points

When the light emitting points of the light source is arranged in a lattice composed of M by N lattice points, it is necessary that both M and N are integers equal to or greater than six so as to achieve satisfactorily high-speed and high-density image formation. On the contrary, in order to avoid growth in size of the light source, it is preferred that both M and N are equal to or less than ten. Therefore, preferably, the smaller of M and N is six. Further, the difference between M and N is preferably one so as to minimize variations in distances of the respective light emitting points from the optical axis.

Advantages

In the optical scanning devices according to the embodiments above, the photosensitive drum is exposed to light emitted from a plurality of light emitting points at the same time, and therefore, high-speed and high-density image writing is possible. Also, the boundaries of scanning areas are subjected to interlace scanning, and density unevenness due to reciprocity law failure can be suppressed. Further, since no light emitting points are arranged in the central part of the light source, problems that may be caused by thermal crosstalk and the wiring to the central part of the light source can be prevented. Thus, the optical scanning devices according to the embodiments above is capable of performing high-speed and high-density image writing while suppressing density unevenness and preventing problems that may be caused by thermal crosstalk, thereby resulting in formation of quality images.

Although the present invention has been described in connection with the preferred embodiments above, it is to be noted that various changes and modifications are possible to those who are skilled in the art. Such changes and modifications are to be understood as being within the scope of the present invention.

What is claimed is:

1. An optical scanning device comprising:
   a light source comprising a plurality of light emitting points arranged on a plane two-dimensionally;
   a deflector for deflecting beams emitted from the light emitting points in a main-scanning direction;
   a first optical system for directing the beams emitted from the light emitting points to the deflector; and
   a second optical system for directing the beams deflected by the deflector to a photosensitive member and for imaging the beams on a surface of the photosensitive member;
   wherein the plurality of light emitting points are arranged in a parallelogram lattice composed of M by N lattice points, wherein M and N are integers equal to or greater than six, with none of the light emitting points allocated on central (M−4) by (N−4) lattice points.

2. An optical scanning device according to claim 1, wherein the beams emitted from the light emitting points located on opposing corners of the parallelogram lattice with respect to a sub-scanning direction are scanned in such a manner to be imaged on scanning lines adjacent to each other in a sub-scanning direction of the photosensitive member; and
   wherein in a plural scanning motions carried out by deflection of the deflector and movement or rotation of the photosensitive member, a scanning area in a scanning motion overlaps with a scanning area in a next scanning motion.

3. An optical scanning device according to claim 1, wherein none of the light emitting points are allocated on the uppermost and the lowermost of the lattice points of the parallelogram lattice in a sub-scanning direction.

4. An optical scanning device according to claim 1, wherein both M and N are integers equal to or less than ten.

5. An optical scanning device according to claim 4, wherein a difference between M and N is one.

6. An optical scanning device according to claim 4, wherein a smaller one of M and N is six.

* * * * *